US010764533B2

(12) United States Patent
Russell et al.

(10) Patent No.: US 10,764,533 B2
(45) Date of Patent: Sep. 1, 2020

(54) COMPUTERWORKSTATION WITH CURVED LENTICULAR DISPLAY

(71) Applicant: Google LLC, Mountain View, CA (US)

(72) Inventors: Andrew Russell, Santa Clara, CA (US); Andrew Huibers, Los Altos, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 16/185,757

(22) Filed: Nov. 9, 2018

(65) Prior Publication Data

US 2020/0154076 A1    May 14, 2020

(51) Int. Cl.
*H04N 7/14*     (2006.01)
*H04N 13/383*   (2018.01)
*H04N 7/15*     (2006.01)
*H04N 13/194*   (2018.01)
*H04N 13/302*   (2018.01)

(52) U.S. Cl.
CPC .............. *H04N 7/142* (2013.01); *H04N 7/15* (2013.01); *H04N 13/194* (2018.05); *H04N 13/302* (2018.05); *H04N 13/383* (2018.05)

(58) Field of Classification Search
USPC .......................................... 348/14.01–14.09
See application file for complete search history.

(56) References Cited

U.S. PATENT DOCUMENTS

| 9,314,692 | B2 * | 4/2016 | Konoplev | ............... A63F 13/12 |
| 2003/0035001 | A1 * | 2/2003 | Van Geest | ........... H04N 13/366 715/753 |
| 2007/0291185 | A1 * | 12/2007 | Gelb | .................... H04N 9/3185 348/745 |
| 2018/0077384 | A1 | 3/2018 | Goldman et al. | |
| 2019/0108683 | A1 * | 4/2019 | Valli | ....................... G06T 15/20 |

OTHER PUBLICATIONS

Zhang et al., "Viewport: A Fully Distributed Immersive Teleconferencing System with Infrared Dot Pattern", Technical Report MSR-TR-2012-60, Microsoft Research, Oct. 2012, 11 pages.

* cited by examiner

*Primary Examiner* — Maria El-Zoobi

(57) ABSTRACT

A computer workstation includes a curved autostereoscopic display having one or more display regions. The workstation further includes one or more image capturing devices to capture images (e.g., two-dimensional images and depth information) of a user of the workstation, and also includes an eye-tracking module to track the positions of the user's eyes as she uses the workstation. Based on the captured imagery, the workstation generates a 3D model of the user for communication to other remote workstations via a network. The workstation receives 3D models of the users of the remote workstations via the network. Based on the received 3D models and the detected eye positions of the user, the workstation generates frames for display at the curved autostereoscopic display.

21 Claims, 4 Drawing Sheets

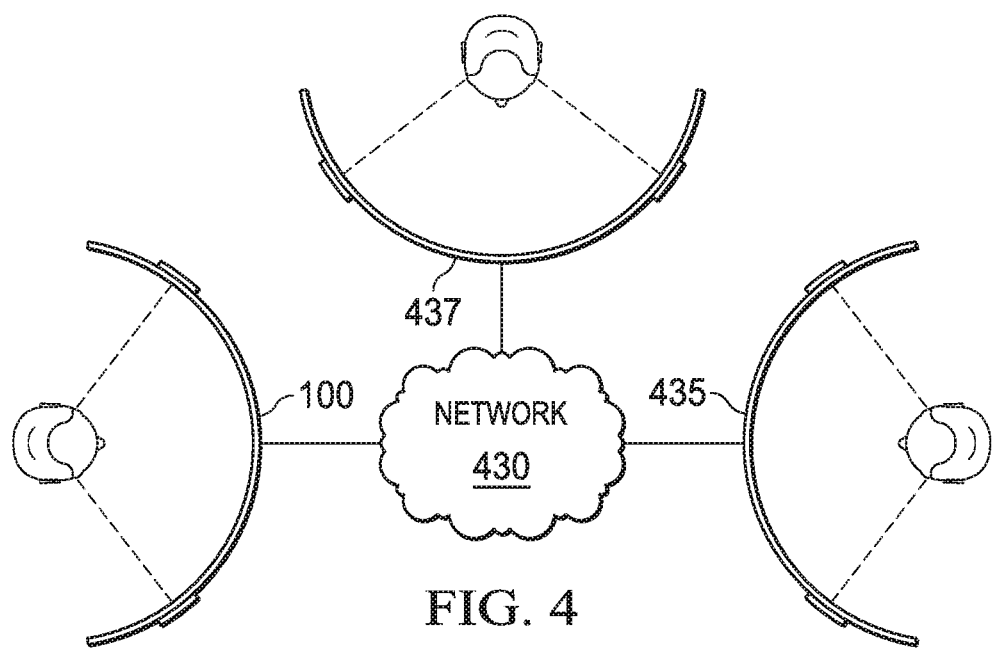
FIG. 4
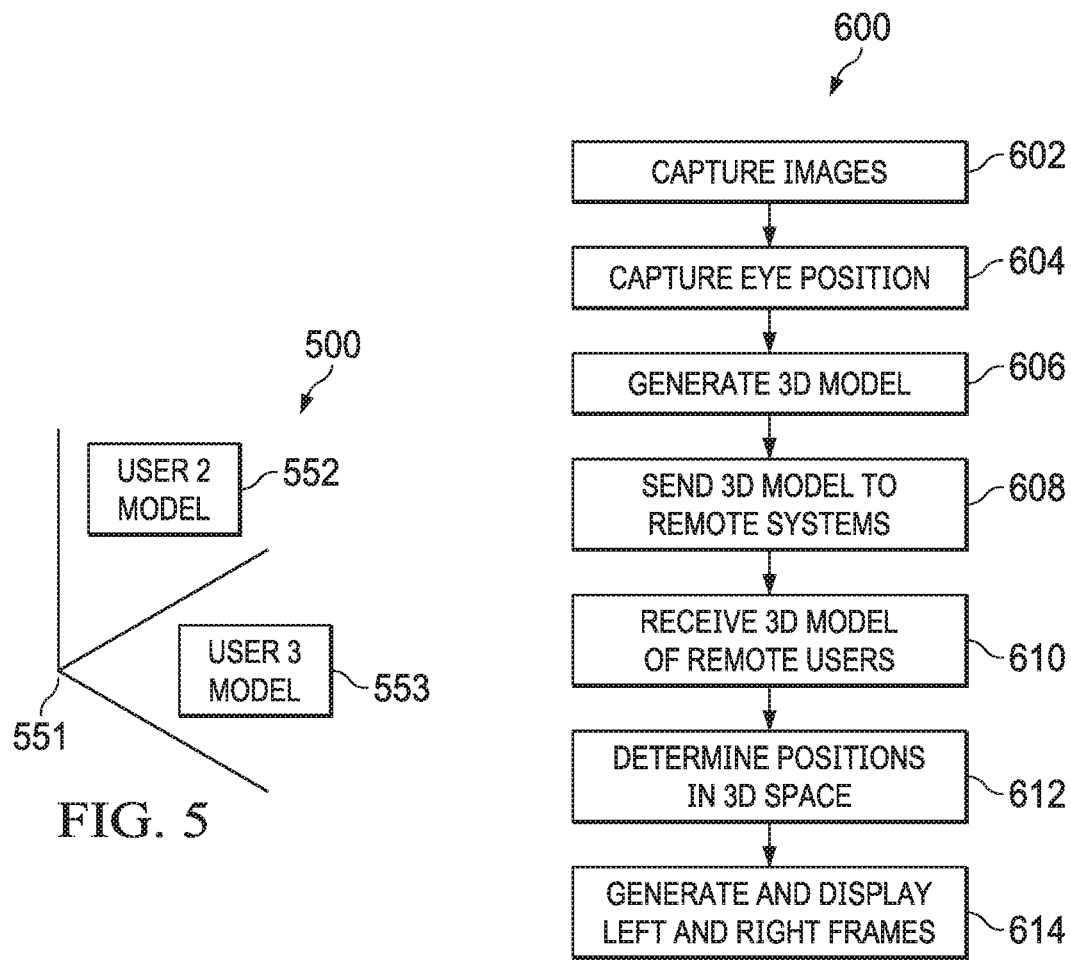
FIG. 5
FIG. 6

COMPUTER WORKSTATION WITH CURVED LENTICULAR DISPLAY

BACKGROUND

Field of the Disclosure

The present disclosure relates generally to display systems and more particularly to computer display systems.

Description of the Related Art

Video-based communication systems, such as video calling and video conferencing systems, are employed in a variety of applications and settings to enhance interactivity during communication. For example, relative to a communication system that supports only audio-based interaction (e.g., a telephone), a video-based communication system supports more efficient transfer of information. In particular, the video-based communication system supports the visual transfer of information, thereby allowing pictures, graphs, tables, and other imagery to be efficiently communicated between users. Furthermore, because users can see each other as they speak, video-based communications systems can provide for better understanding of discussed topics, better recognition of emotion and intensity via facial expressions, and the like. However, conventional video-based communication systems support relatively limited interaction between users, thus undesirably limiting the user experience.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

FIG. 4 is a block diagram illustrating multiple computer workstations communicating via a network in accordance with at least one embodiment.

FIG. 5 is a diagram illustrating an example of the computer workstation of FIG. 1 placing 3D user models in a 3D space for display in accordance with at least one embodiment.

FIG. 6 is a flow diagram of a method of employing a curved autostereoscopic display with multiple display regions to display 3D user models during video-based interaction in accordance with at least one embodiment.

DETAILED DESCRIPTION

FIGS. 1-6 illustrate techniques for employing a curved autostereoscopic display with multiple display regions to display 3D user models during video-based interaction in accordance with some embodiments. A computer workstation includes the curved autostereoscopic display having one or more display regions. The workstation further includes one or more image capturing devices to capture images (e.g., two-dimensional images and depth information) of a user of the workstation, and also includes an eye-tracking module to track the positions of the user's eyes as she uses the workstation. Based on the captured imagery, the workstation generates a 3D model of the user for communication to other remote workstations via a network. The workstation receives 3D models of the users of the remote workstations via the network. Based on the received 3D models and the detected eye positions of the user, the workstation generates frames for display at the curved autostereoscopic display. The workstation thereby provides an immersive and responsive video environment to the user, enhancing the user experience with video-based communication and other applications.

Figure 1:
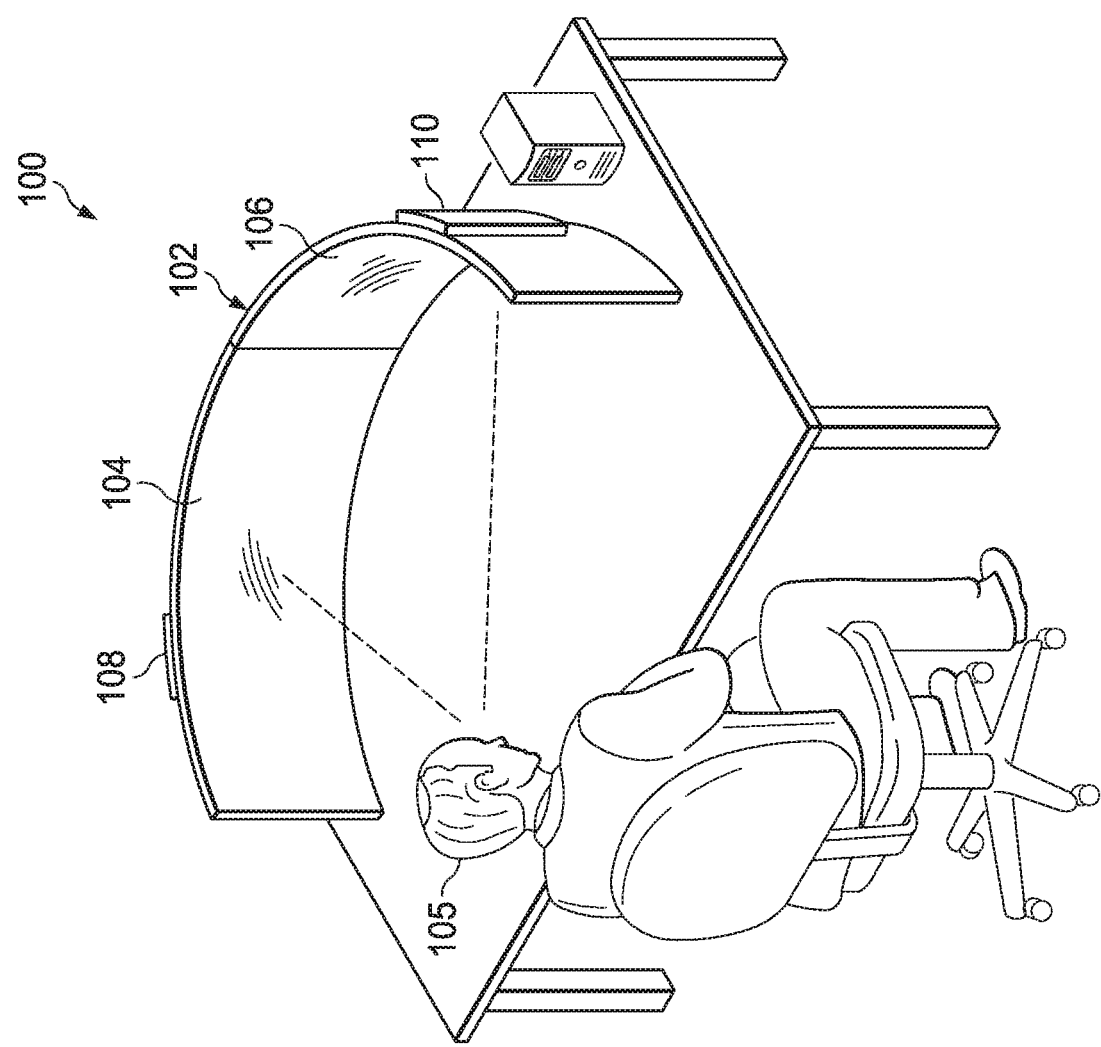
FIG. 1 is a diagram of a perspective view of a computer workstation including a curved autostereoscopic display with multiple display regions to support three-dimensional (3D) display of user models during video-based interaction in accordance with at least one embodiment.

FIG. 1 illustrates a perspective view of a workstation 100 in accordance with some embodiments. The workstation 100 is described herein with respect to an example implementation in a telepresence system for video communication. However, it will be appreciated that in different embodiments the workstations 100 can be employed in a variety of implementations and applications, including virtual reality and augmented reality display systems, computer gaming systems, general computing applications, and the like.

In the depicted example, the workstation 100 includes a display 102. In at least one embodiment, the display 102 includes an autostereoscopic display panel including one more more display regions (e.g., regions 104 and 106 of FIG. 1), with each region including a subset of the pixels of the display 102. As described further herein, a processor (not shown at FIG. 1) of the workstation 100 is configured to generate display frames for each region of the display panel 102 to create the impression of a three-dimensional (3D) image for a user 105. Thus, for example, in at least one embodiment the display 102 includes a liquid crystal display (LCD) or organic light-emitting diode (OLED) display and a lenticular array overlying the display. The lenticular array includes a plurality of lenses, with each lens overlying a region, or a portion of a region, of the display 102, with each lens positioned so as to create the appearance of a 3D image from a two-dimensional image rendered at the display. In other embodiments, the display 102 can be another type of autostereoscopic display, such as a display including a parallax barrier, a display including both a parallax barrier and a lenticular array, a display where individual light emitting elements emit light in specific angle such that one eye of a user can be illuminated without significantly illuminating the other eye, a compressive light field display, holographic display and the like.

Figure 2:
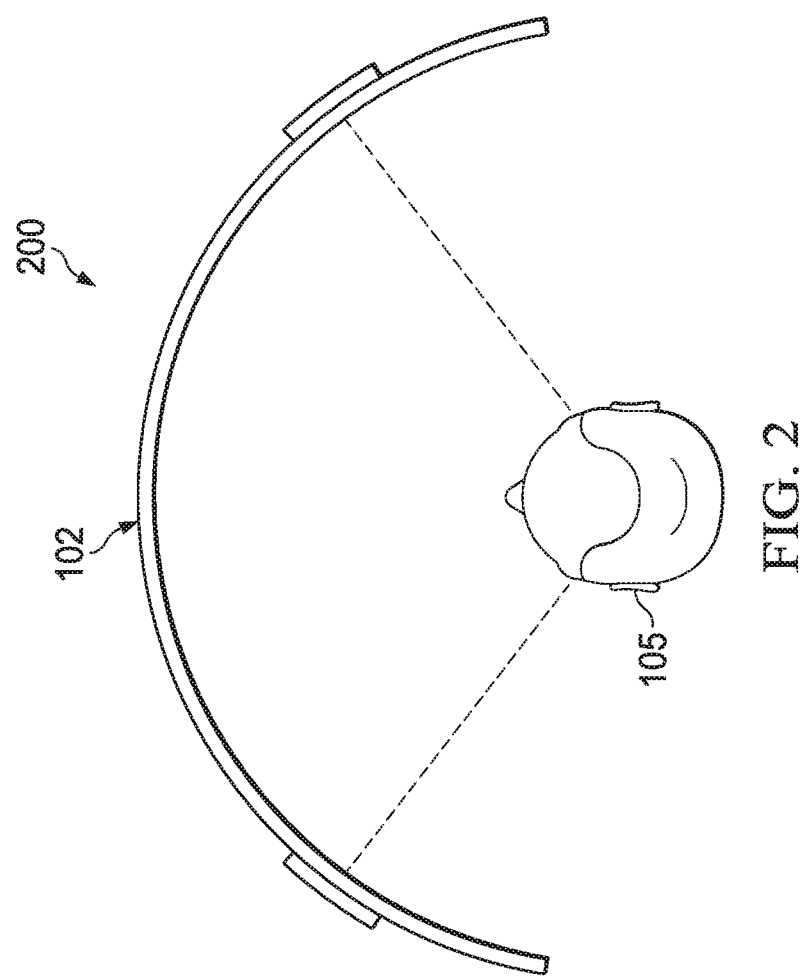
FIG. 2 is a diagram illustrating a top-down view of the computer workstation of FIG. 1 in accordance with at least one embodiment.

As illustrated at FIG. 1, the display 102 is a curved display. In the depicted embodiment, the display 102 is curved along an arc that forms part of a circle have a center at an expected position of the user 105. The curve of the display 102 can be further appreciated with reference to FIG. 2, which illustrates a top-down view 200 of the workstation 102. In the embodiment of FIG. 2, the display 102 forms a 180 degree arc about the center. In other embodiments, the display 102 may form a smaller or larger arc, such as an arc of between 60 and 270 degrees. The curved nature of the display 102, together with the autostereoscopic display panel, allows the workstation 100 to support display of an immersive 3D environment for the user 105, as described further herein.

In addition to the display 102, the workstation 100 includes components, including an image capture module 110 and an eye tracking module 108, to support generation of a 3D model of the user 105 for communication to remote workstations in order to support video-based communication applications such as video conferencing, as described further below. The image capture module 108 includes one or more cameras or other image capturing devices configured to capture images of the environment of the workstation 100, and in particular images of the user 105. In at least one embodiment the image capture module 110 includes at least one camera to capture visible-light based pictures of the user 105 and a depth camera to capture depth images of the user 105. The depth camera system can include an infra-red (IR) emitter to periodically emit IR light and an IR camera to capture IR images of the user 105 based on the emitted IR light, wherein the IR images can be processed to produce depth data for the user 105. Visible light cameras can also create depth data using multiple view stereo techniques. As described further herein, a processor of the workstation 100 can employ the captured visible-light images and the depth data to create a 3D model of the user 105 for communication to other remote workstations.

The eye tracking module 108 includes one or more cameras or other image capturing devices configured to capture images of the eyes of the user 105, and further includes one or more processors configured to identify the position and orientation (collectively referred to herein as a pose) of the eyes. In at least one embodiment, the eye tracking module 108 is configured to identify the pose of each of the left and right eyes of the user 105 individually. That is, the pose data generated by the eye tracking module 108 can indicate different concurrent positions of the left eye and the right eye. The processor of the workstation 100 can employ the eye pose data to support generation of 3D images at the display 102. For example, in at least one embodiment the processor 100 generates individual left-eye and right-eye frames for display, and selects, based on the eye pose data, pixel regions of the display 102 to display corresponding portions of each of the left-eye and right-eye frames thereby creating a stereoscopic effect for the overall image displayed at the display 102.

Figure 3:
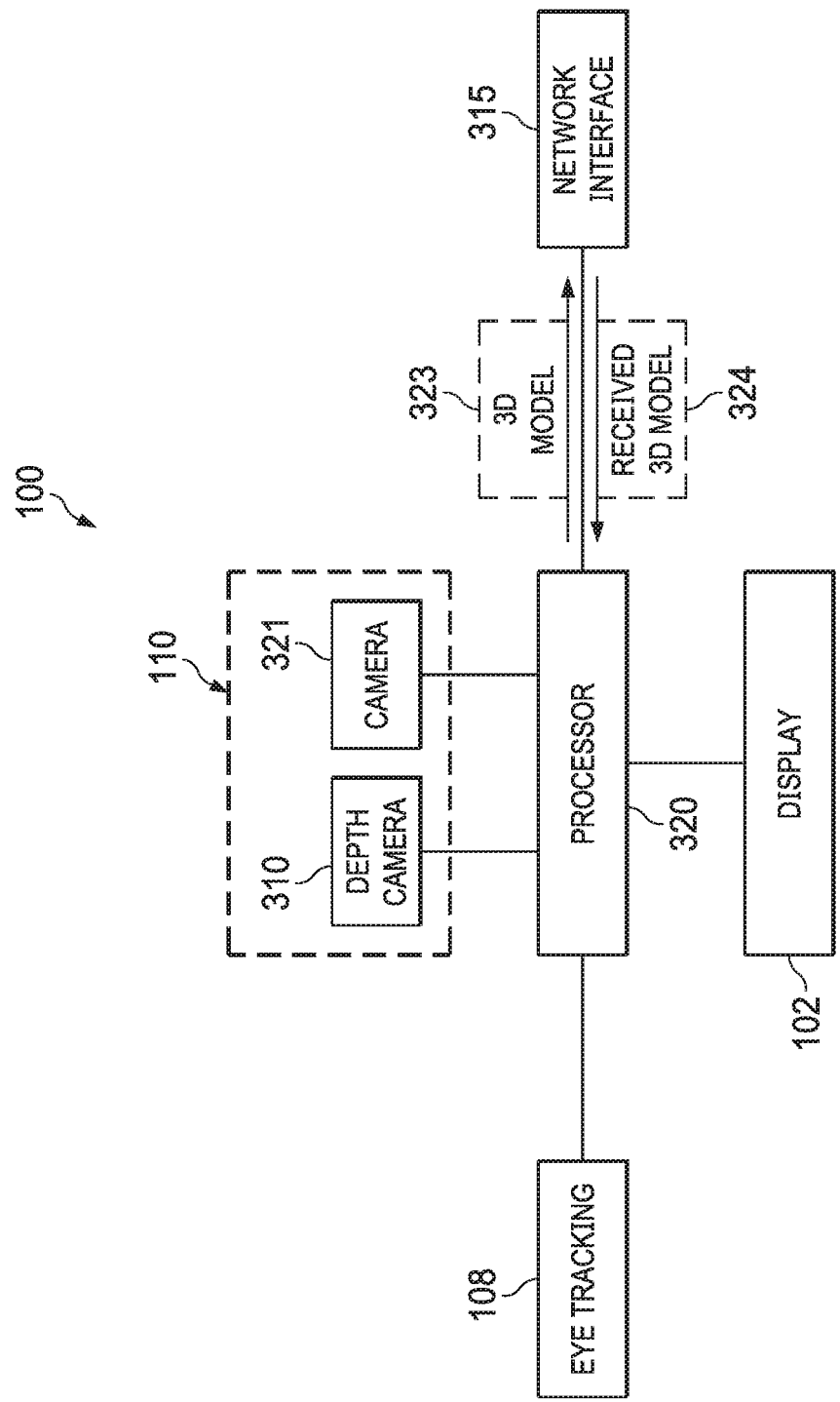
FIG. 3 is a block diagram of various components of the computer workstation of FIG. 1 in accordance with at least one embodiment.

Operation of the workstation 100 can be better understood with reference to FIG. 3, which illustrates a block diagram of portions of the workstation 100 in accordance with at least one embodiment. In the depicted example, in addition to the display 102, the eye tracking module 108, and the image capture module 110 (illustrated as including a camera 321 and a depth camera 322), the workstation includes a network interface 315 and a processor 320. The network interface 315 is generally configured to provide a least a physical (PHY) and logic layer interface for the workstation to one or more communication networks, such as a local area network, a wide area network (e.g. the Internet) or a combination thereof.

The processor 320 is a processing device, such as a central processing unit (CPU), a graphics processing unit (GPU), neural network processor, or a combination thereof, configured to execute operations for the workstation 100 as described further herein. It will be appreciated that although for clarity the processor 320 is illustrated as a single processor, in some embodiments the processor 320 can represent multiple processing units, with each processing unit including one or more processor cores or other compute units. For example, in at least one embodiment the processor 320 represents at least one CPU having multiple processor cores and at least one GPU having multiple single-instruction multiple data (SIMD) compute units configured to execute graphical operations.

In operation, the processor 320 controls the camera 321 and the depth camera 322 to capture images and depth data of the user 105. Based on the captured images and depth data, the processor 320 generates a 3D model 323 of the user 105. In at least one embodiment the processor 320 generates the 3D model 323 by selecting one of a plurality of pre-defined models (not shown at FIG. 3) of the user 105, wherein the pre-defined models can be created during a calibration of the workstation 100. In other embodiments, the pre-defined models can be defined based on previously identified poses of the user 105 during use of the workstation 100. Each of the pre-defined models can represent a different position of the user 105. The processor 320 can match one or more of the depth data and the images to one of the pre-defined models based on a pre-defined or dynamically generated energy function. The energy function generates, for each pre-defined model, an energy cost indicative of a difference between the depth data or image data, or a combination thereof, and the corresponding pre-defined model. The processor 320 selects the pre-defined pose having the lowest energy cost—that is, the pre-defined pose that most closely fits the captured image and depth data. In some embodiments, the processor 300 can form a 3D mesh based on the selected pre-defined model, and adjust the mesh based on the captured image and depth data to generate the 3D model 323 so that it closely matches a current pose of the user 105.

To create a telepresence environment, the processor 300 communicates 3D models with other remote workstations via the network interface 315, wherein in at least one embodiment the remote workstations can be configured similarly to the workstation 100. The processor 300 provides the 3D model 323 to the network interface 315 for communication to the remote workstations. In addition, the network interface 315 receives 3D models 324 from the remote workstations, wherein each of the 3D models 324 represents a user of the corresponding workstation and is generated by the corresponding workstation in a similar fashion as described above with respect to the 3D model 323.

The processor 300 places each of the received 3D models in a virtual 3D environment. In some embodiments, the processor 300 can also place in the 3D environment one or more pre-defined or selectable virtual objects, such as a virtual conference table, virtual whiteboard, and the like. For example, in at least one embodiment the processor 300 places each of the received 3D models around a virtual conference table, such that each user of a participating workstation appears to be arrayed around the virtual conference table. The processor 320 generates a plurality of frames based on the 3D environment for rendering at the display 102. In at least one embodiment, the processor 320 generates different frames for concurrent display, each frame targeted to a different eye of the user 105. The processor 320 renders the left-eye and right-eye frames at corresponding portions of the display 102 to create a stereoscopic effect for the user 105, such that the virtual 3D environment appears in 3 dimensions to the user 105. Because the display 102 is a curved display that, in at least one embodiment, is curved along an arc of at least 160 degrees, the display of the 3D environment is more immersive relative to conventional, flat displays. For example, as illustrated at FIG. 2, the user 105 can orient the display 102 so that the 3D environment encompasses both the central vision and peripheral vision of the user 105, increasing the immersivity of the displayed environment and thus improving the user experience.

The use of the workstation 100 for video-based communication can be better understood with reference to FIG. 4, which illustrates multiple workstations communicating via a network in accordance with at least one embodiment. In the depicted embodiment, the workstation is connected to a network 430, which is further connected to workstations 435 and 437. Each of the workstations 435 and 437 are configured similarly to the workstation 100 as described above with respect to FIG. 3. The network 430 is a packet-switched network generally configured to communicate packets between the workstations 100, 435, and 437. Accordingly, the network 430 can be a local area network, a wide area network (e.g., the Internet), or a combination thereof.

In operation, each of the workstations 100, 435, and 437 generate 3D models of their respective users based on captured images and captured depth information as described above with respect to FIGS. 1-3. Each workstation communicates the corresponding 3D model of the respective user to the other workstations via the network 430. Each workstation receives the 3D models from the other workstations, places the received 3D models in a virtual 3D environment, and displays the virtual 3D environment via the corresponding autostereoscopic display.

In at least one embodiment, each of the each of the workstations 100, 435, and 437 continues to periodically generate and provide 3D models to the other workstations for display in the virtual 3D environment. The period of generation and provision of the 3D models is such that the frames rendered by each workstation reflect movement of the corresponding users in a natural way, without distracting discontinuities.

In at least one embodiment, each of the workstations 100, 435, and 437 includes one or more microphones to record audio, such as the voice of the corresponding user. Each workstation can communicate the recorded audio to the other workstations along with, or close in time to providing the 3D model. In addition, each workstation can synchronize the received audio with the received 3D models so that, for example, user speech is synchronized with the corresponding lip movements of the user. The workstations 100, 435, and 437 thus support immersive video conferencing and other video-based communication applications. It will be appreciated that the number of workstations and users illustrated in the embodiment of FIG. 4 is an example only, and that in other embodiments fewer or more workstations can be employed to allow fewer or more users to communicate. For example, in some embodiments three or four users (or more) can communicate via three or four (or more) workstations using the techniques described herein.

FIG. 5 is a diagram illustrating an example of the workstation 100 placing received 3D models of other users (e.g., the users of workstations 435 and 437 of FIG. 4) in a 3D space 500 for display in accordance with at least one embodiment. In the depicted example, the workstation 100 places the user 105 at an origin 551 of the 3D space 500, then places user models 552 and 553 at positions relative to the origin 551. In at least one embodiment, the workstation 100 places the user models 552 and 553 at pre-defined positions based, for example, on the number of users interacting via the corresponding workstations. For example, in at least one embodiment the workstation 100 places each of the user models 552 and 553 at a corresponding position around a virtual conference table, with the position at the virtual conference table for each user model being pre-defined. In other embodiments, the user 105 can configure or program the workstation 100 to select the position of each the user models 552 and 553 in the 3D space 500.

FIG. 6 illustrates a flow diagram of a method 600 of employing a workstation having a curved autostereoscopic display with multiple display regions to display 3D user models during video-based communication in accordance with at least one embodiment. At block 602, the workstation employs one or more cameras to capture images of a user of the workstation. In at least one embodiment, the one or more cameras includes a depth camera that captures depth information associated with the user of the workstation. At block 604 the workstation employs an eye tracking module to capture images of the eyes of the user, and to determine individual eye positions of the user's left and right eyes based on the captured eye images.

At block 606 the workstation generates a 3D model of the user based on the images and depth information captured at block 602. At block 608 the workstation employs a network interface to communicate the generated 3D model to one or more remote workstations via a local area or wide area network. At block 610 the workstation employs the network interface to receive, via the local area or wide area network, 3D models of corresponding users of the remote workstations.

At block 612, the workstation determines the positions for each of the received 3D models in a 3D space of a virtual environment, such as a virtual conference room. At block 614, based on the virtual environment with the 3D models placed in their corresponding positions, the workstation generates left-eye and right-eye frames for concurrent display. The workstation displays the left-eye and right-eye frames at corresponding regions of the curved autostereoscopic display, wherein the regions are based at least in part on the eye positions determined at block 604. The workstation thereby displays the received 3D models in the virtual environment via an apparently 3D image. The curved autostereoscopic display thus supports an immersive interaction with other users, improving video-based communication.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A device comprising:
a display comprising a curved autostereoscopic panel including a first subset of pixels and a second subset of pixels;
an eye-tracking module to track a left-eye position and a right-eye position of a first user;
an image capture device to capture an image of the first user;
a network interface to receive three-dimensional (3D) content from a first remote device; and
a processor to:
generate a left-eye frame and a right-eye frame based on the received 3D content, the left-eye position, and the right-eye position;
display the left-eye frame at the first subset of pixels and the right-eye frame at the second subset of pixels; and
generate a 3D model of the first user by selecting a pre-defined 3D model that most closely matches the captured image of the first user from a plurality of pre-defined 3D models of the first user and provide the generated 3D model to the network interface, wherein the pre-defined 3D model is selected based on an energy cost generated for each of the plurality of pre-defined 3D models of the first user.

2. The device of claim 1, wherein the processor is to generate the left-eye frame and the right-eye frame to display an apparently 3D image to the first user at the display.

3. The device of claim 1, wherein:
the network interface is to communicate the 3D model of the first user to the first remote device.

4. The device of claim 3, wherein the received 3D content comprises a 3D model of a second user of the first remote device.

5. The device of claim 4, wherein the processor is to generate the left-eye frame and the right-eye frame by:
identifying a position of the 3D model of the second user in a 3D space; and
generating the left-eye frame and the right-eye frame based on the identified position.

6. The device of claim 5, wherein identifying the position of the 3D model of the second user comprises:
identifying positions of each of a plurality of 3D models of users in the 3D space, the positions of each of the plurality of 3D models including the position of the 3D model of the second user.

7. The device of claim 6, wherein identifying positions of each of a plurality of 3D models of users comprises:
assigning each of the plurality of 3D models of users a corresponding pre-defined position in the 3D space.

8. The device of claim 6, wherein the network interface is to receive each of the plurality of 3D models from a corresponding remote device.

9. A method, comprising:
capturing an image of a first user an image capture device of a workstation;
tracking left-eye position and a right-eye position of the first user at an eye-tracking module of the workstation;
receiving three-dimensional (3D) content from a first remote device via a network interface of the workstation;
generating a left-eye frame and a right-eye frame based on the received 3D content, the left-eye position, and the right-eye position;
displaying the left-eye frame at a first subset of pixels and the right-eye frame at a second subset of pixels of a display comprising a curved autostereoscopic panel including the first subset of pixels and the second subset of pixels; and
generating a 3D model of the first user by selecting a pre-defined 3D model that most closely matches the captured image of the first user from a plurality of pre-defined 3D models of the first user and provide the generated 3D model to a network interface, wherein the pre-defined 3D model is selected based on an energy cost generated for each of the plurality of pre-defined 3D models of the first user.

10. The method of claim 9, wherein generating the left-eye frame and the right-eye frame comprising generating the left-eye frame and the right-eye frame to display an apparently 3D image to the first user at the display.

11. The method of claim 9, further comprising:
communicating the 3D model of the first user to the first remote device.

12. The method of claim 11, wherein the received 3D content comprises a 3D model of a second user of the first remote device.

13. The method of claim 12, wherein generating the left-eye frame and the right-eye frame comprises:
identifying a position of the 3D model of the second user in a 3D space; and
generating the left-eye frame and the right-eye frame based on the identified position.

14. The method of claim 13, wherein identifying the position of the 3D model of the second user comprises:

identifying positions of each of a plurality of 3D models of users in the 3D space, the positions of each of the plurality of 3D models including the position of the 3D model of the second user.

15. The method of claim 14, wherein identifying positions of each of a plurality of 3D models of users comprises:
assigning each of the plurality of 3D models of users a corresponding pre-defined position in the 3D space.

16. The method of claim 14, wherein the network interface is to receive each of the plurality of 3D models from a corresponding remote device.

17. A non-transitory computer readable storage medium tangibly embodying stored instructions that, when executed by at least one processor, are configured to manipulate a workstation to at least:
capture an image of a first user an image capture device of the workstation;
track a left-eye position and a right-eye position of the first user at an eye-tracking module of the workstation;
receive three-dimensional (3D) content from a first remote device via a network interface of the workstation;
generate a left-eye frame and a right-eye frame based on the received 3D content, the left-eye position, and the right-eye position; and
display the left-eye frame at a first subset of pixels and the right-eye frame at a second subset of pixels of a display comprising a curved autostereoscopic panel including the first subset of pixels and the second subset of pixels; and
generate a 3D model of the first user by selecting a pre-defined 3D model that most closely matches the captured image of the first user from a plurality of pre-defined 3D models of the first user and provide the generated 3D model to a network interface, wherein the pre-defined 3D model is selected based on an energy cost generated for each of the plurality of pre-defined 3D models of the first user.

18. The computer readable storage medium of claim 17, wherein the instructions to generate the left-eye frame and the right-eye frame comprise instructions to generate the left-eye frame and the right-eye frame to display an apparently 3D image to the first user at the display.

19. The computer readable storage medium of claim 17, wherein the instructions further comprise instructions to communicate the 3D model of the first user to the first remote device.

20. The computer readable storage medium of claim 19, wherein the received 3D content comprises a 3D model of a second user of the first remote device.

21. A device comprising:
a display comprising a curved autostereoscopic panel;
a network interface to receive three-dimensional (3D) content from a first remote device;
an image capture device to capture an image of a user; and
a processor to:
generate frames based on the 3D content for display at the curved autostereoscopic display; and
generate a 3D model of the user by selecting a pre-defined 3D model that most closely matches the captured image of the user from a plurality of pre-defined 3D models of the user and provide the generated 3D model to the network interface, wherein the pre-defined 3D model is selected based on an energy cost generated for each of the plurality of pre-defined 3D models of the first user.

* * * * *